Dec. 19, 1967         J. C. WILSON         3,358,788
METHOD AND APPARATUS FOR ACOUSTIC CEMENT BOND LOGGING
Filed July 25, 1963                              2 Sheets-Sheet 1

INVENTOR.
JOHN C. WILSON
BY
Russell E. Schloff
ATTORNEY

Dec. 19, 1967   J. C. WILSON   3,358,788
METHOD AND APPARATUS FOR ACOUSTIC CEMENT BOND LOGGING
Filed July 25, 1963   2 Sheets-Sheet 2

FIG. 1-A

INVENTOR.
JOHN C. WILSON
BY
Russell E. Schloff
ATTORNEY

# United States Patent Office 3,358,788
Patented Dec. 19, 1967

3,358,788
METHOD AND APPARATUS FOR ACOUSTIC CEMENT BOND LOGGING
John C. Wilson, Houston, Tex., assignor to Dresser Industries, Inc., Dallas, Tex., a corporation of Delaware
Filed July 25, 1963, Ser. No. 297,501
2 Claims. (Cl. 181—.5)

ABSTRACT OF THE DISCLOSURE

A single acoustic receiver is gated twice following an acoustic signal generated in the casing of a well bore. The first gate is set to correspond to the arrival of the acoustic signal traveling only through the casing. The second gate is set to open before the first gate to thus receive acoustic signals from any formation exterior to the casing which causes such signals to have a velocity greater than the velocity of the signals through the casing.

This invention relates to acoustic cement bond logging and is particularly directed to a novel method and apparatus for determining when formation effects are interfering with the cement bond log.

The modern practice in drilling wells for oil and the like calls for the borehole to be lined with casing pipe which is secured to the formations surrounding the borehole by cement which is squeezed into the annulus formed between the casing pipe and the borehole wall. In some instances, the cement will not form a proper bond with the formations and may leave gaps or cavities. It is desirable to perforate in those portions of the productive zone wherein a good bond has been formed between the casing and the surrounding cement sheath. This is because imperfections, such as the presence of voids or channels, in the cement sheath permit fluids from adjacent zones to flow into the perforations and mix with the desired fluids or, in some cases, substantially inhibit their production. Accordingly, it is desirable to be able to determine the location and extent of such improper bonding.

It has been found that acoustic well logging techniques are helpful in making this determination and numerous methods and apparatus have been proposed heretofore for this purpose. One such technique is disclosed in my copending application S.N. 109,637, filed May 12, 1961, and now U.S. Patent No. 3,186,223. In general, the systems employed for this purpose include devices that periodically emit acoustic pulses which travel through the cement, casing pipe and formation surrounding the borehole and are detected by a suitable receiver spaced a predetermined distance from the transmitting device. By measuring characteristics of the detected pulses, such as travel time through the various media and the magnitude of the pulses, it is generally possible to determine the quality of the cement bond.

Ordinarily, the acoustic pulses travel through the casing pipe more rapidly than through the cement or the formations and, since the magnitude of the pulses is a function of the acoustic coupling which in turn is a function of the quality of the cement bond, it is possible to measure the magnitude of the acoustic pulses traveling through the casing pipe and to determine thereby the quality of the cement bond. Unfortunately, this is not always true. While in soft rock areas, such as sandstones and shales, measurements of this type are quite reliable, it has been found that in hard rock areas, such as limestones, such a log may be sometimes misleading. This is due to the fact that, in such areas, the pulses traveling through the formation may actually reach the detector before the pulses traveling through the casing pipe. When this occurs, the receiver may detect portions of the formation signal simultaneously with the casing pipe signal and will yield a signal having a magnitude which is a combination of the magnitudes of these two signals and which is subject to misinterpretation by the operator. Thus, in zones having a porosity of about 5% or less, the log may indicate poor bonding although the bond may actually be good.

Various systems have been proposed for overcoming this defect. One such system is to have an integral time log run simultaneously with the cement bond log. However, the equipment for accomplishing this is highly complex and expensive and requires the use of multiconductor cable.

These disadvantages of the prior art are overcome with the present invention and novel method and apparatus for acoustic cement bond logging are provided which provide a clear and unmistakable indication whenever the formation signals reach the receiver before the casing pipe signals to facilitate interpretation of the cement bond fog and which is accomplished by means of apparatus which is simple, reliable, inexpensive and is readily accomplished on single conductor cable.

The advantages of the present invention are preferably accomplished by providing a novel method of acoustic cement bond logging whereby formation signals arriving at the receiver before the casing pipe signals are detected and are recorded correlatively with the cement bond log to indicate to the operator that poor bond indications on the cement bond log are not reliable at that point and by providing novel apparatus for acoustic cement bond logging comprising a pair of similar electronic gating circuits which are connected to receive signals from the receiver and to pass preselected ones of said signals to respective traces of a multiple trace recorder. With this apparatus, one of the gating circuits is set to pass those signals which correspond to acoustic pulses that have traveled through the casing pipe while the other gating circuit is set to pass only those signals which are detected during a preselected time interval before arrival of the casing pipe signals. By supplying the signals from these gating circuits to respective traces of a multiple trace recorder, it is found that a clear and unmistakable indication is provided whenever the formation signals reach the receiver before the casing pipe signals. Consequently, in interpreting the cement bond log, it is readily apparent when the formation signals are interfering with the cement bond log and it is frequently possible to determine the true condition of the cement bond in spite of such interference.

Accordingly, it is an object of the present invention to provide novel methods and apparatus for acoustic cement bond logging.

Another object of the present invention is to provide novel methods and apparatus for acoustic cement bond logging whereby erroneous poor bond indications obtained in hard rock areas can be readily identified.

A further object of the present invention is to provide simple and inexpensive apparatus for indicating when formation signals are interfering with an acoustic cement bond log.

A specific object of the present invention is to provide novel apparatus for acoustic cement bond logging comprising a transmitter for emitting periodic acoustic pulses, a receiver spaced a predetermined distance from said transmitter for detecting the acoustic pulses and for converting the detected acoustic pulses into electrical signals, a pair of electronic gate circuits, means for supplying electrical signals from said receiver to both of said gate circuits, means for opening one of said gate circuits after a first predetermined time delay to pass signals from said receiver detected during a first predetermined time interval, means for opening the other of said gate circuits after a second predetermined time delay which is shorter than said first time delay to pass signals from said receiver detected during a time interval prior to the beginning of said first time interval, and means for correlatively displaying the signals passed by said gate circuits.

Another specific object of the present invention is to provide novel methods of acoustic cement bond logging comprising the steps of generating an acoustic pulse at a first point in a cased borehole, detecting acoustic pulses at a second point in said borehole spaced a predetermined distance from said first point, converting the detected acoustic pulses to electrical signals, supplying said signals to a pair of gate circuits, opening one of said gate circuits after a first predetermined time delay following generation of said pulse, closing said one of said gate circuits after a second predetermined time delay and simultaneously opening the other of said gate circuits, closing said other of said gate circuits after a third time delay, and correlatively recording the signals passed by each of said gate circuits.

These and other objects and features of the present invention will be apparent from the following detailed description taken with reference to the figures of the accompanying drawings.

In the drawings:

FIG. 1A is a diagrammatic view showing a logging tool embodying the system of the present invention positioned in a used borehole.

Figure 1:
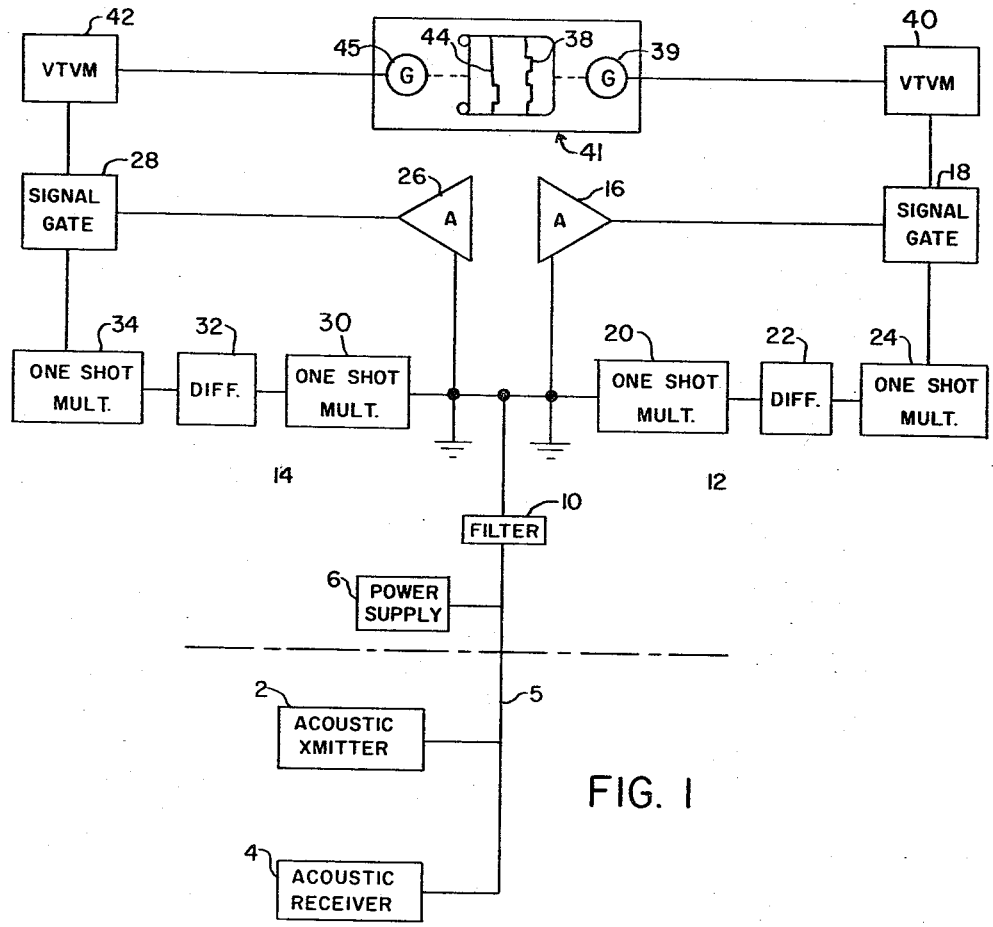
FIG. 1 is a block diagram of a circuit for acoustic cement bond logging apparatus embodying the present invention.

Referring now to the drawings, FIG. 1A illustrates the incorporation of the present invention in a logging system. As shown, the logging system is comprised of an elongated, generally cylindrical logging tool 1, supported within a borehole 3 by a cable 5 which provides electrical connection between the tool 1 and surface electronic equipment generally indicated as 7. As is conventional in well logging, the tool 1 is moved through the borehole 3 by movement of the cable 5 which passes over a measuring wheel 9 providing an indication of depth.

Borehole 3 traverses an earth formation generally indicated as 11 and has set therein a section of steel casing 13. Between the formation 11 and casing 13 therein is an annular sheath of cement 15 which is formed by pumping liquid cement into the space between the formation 11 and casing 13. Frequently, the liquid cement will not fill the annular space perfectly and there will be formed various voids or channels such as those indicated at 17. It is possible to detect the presence of imperfections, such as the channels 17, by measuring the amplitude of a selected sound wave pulse or pulses transmitted through a section of the casing 13. The amplitude of vibration of casing 13 when subjected to an acoustic shock wave is a function of the tightness with which it is held in place by the cement sheath 15 which, in turn, is effected by the presence or absence of voids such as 17. In conducting cement bond logging, a series of acoustic shock waves are emitted from a logging tool, transmitted through a section of adjacent casing and the amplitude of a selected acoustic shock wave is measured as received at a longitudinally spaced portion of the tool after having been transmitted through the casing. This measurement is transmitted electrically to equipment at the top of the borehole and is continuously recorded and correlated with the position of the tool in the well to produce a cement bond log. As previously mentioned, if the formation contains a layer of hard rock indicated as 19, the acoustic signal may travel through the formation faster than through the casing and thereby providing a misleading indication of poor bond. It is the purpose of the present invention to provide an indication of such condition.

In that form of the present invention chosen for purposes of illustration in the drawings, FIG. 1 shows an acoustic transmitter 2 and an acoustic receiver 4 which are incorporated in a suitable subsurface instrument and are energized by an appropriate power supply 6. As shown, the power supply 6 is located in the surface equipment and is connected to the transmitter 2 and receiver 4 by means of a cable 5 which also serves to carry signals from the receiver 4 to the surface equipment. In operation, the transmitter 2 emits periodic acoustic pulses which travel through the casing pipe, cement and the formations surrounding the borehole. The receiver 4 is spaced a predetermined distance from the transmitter 2 and detects acoustic pulses which have traveled this predetermined distance and converts the detected pulses into electrical signals which are sent via cable 5 to the surface equipment and are passed through a suitable filter 10. The filter 10 prevents the power supply signal from being passed to the signal circuits and may include appropriate amplifiers or other signal processing circuits as are conventional in the art.

From the filter 10, the signals from receiver 4 are passed to two similar signal circuits, indicated generally at 12 and 14. Signal circuit 12 comprises a suitable amplifier 16 and a gate circuit 18 which is controlled by a time delay circuit including a first-one-shot multivibrator 20, a differentiator 22 and a second one-shot multivibrator 24. Similarly, signal circuit 14 comprises a suitable amplifier 26 and a gate circuit 28 which is controlled by a time delay circuit including a first one-shot multivibrator 30, a differentiator 32 and a second one-shot multivibrator 34. The signals passed by gate circuit 18 of signal circuit 12 are supplied to a first vacuum tube voltmeter 40 and are recorded as an appropriate trace 38 of a multiple trace recorder 41 by a recording galvanometer 39 while the signals passed by gate circuit 28 of signal circuit 14 are supplied to a second vacuum tube voltmeter 42 and are recorded as trace 44 by a recording galvanometer 45 of the recorder 41. The two traces 38 and 44 are displayed correlative to each other.

In accordance with the present invention, acoustic pulses emitted by the transmitter 2 travel through the casing pipe, cement and the formations surrounding the borehole and are detected by the receiver 4. The receiver 4 converts the detected pulses into electrical signals and supplies these signals via the cable 5 and filter 10 to the signal circuits 12 and 14. As is well known, the signal pattern for acoustic logging comprises a large initial pulse followed, after a time delay which varies with the acoustic transmission characteristics of the material through which the acoustic wave is traveling, by an echo train. As indicated above, the arrival time of the echo train and the magnitude of the signals thereof supply the information from which the nature of the cement bond can be determined. The initial pulse provides no information concerning the cement bond. Therefore, when this pulse is supplied to the signal circuits 12 and 14, it is passed through amplifiers 16 and 26 but is blocked by gate circuits 18 and 28 which are both normally closed. At the same time, however, the initial pulse indicates that an echo train will be arriving shortly and, consequently, the initial pulse is supplied to trigger one-shot multivibrators 20 and 30 to initiate time delays which will control opening and closing of the gate circuits 18 and 28.

It has been found that the time required for acoustic pulses to travel through the casing pipe from the transmitter 2 to the receiver 4 can be determined quite precisely. Accordingly, multivibrator 20 is set to provide a time delay which is approximately equal to the time required for the acoustic pulses to travel through the casing pipe from the transmitter 2 to the receiver 4. At the end of this time delay, multivibrator 20 emits a pulse which is passed through differentiator 22 and triggers multivibrators 24. Multivibrator 24 serves to open gate circuit 18 for a predetermined interval, preferably approximately one-half cycle of the echo train frequency, and then recloses gate circuit 18. In contrast, multivibrator 40 of signal circuit 14 is set to provide a time delay which is shorter than that provided by multivibrator 20 by about one full cycle of the echo train frequency. At the end of this time delay, multivibrator 40 emits a pulse which is passed through differentiator 32 to trigger multivibrator 34. Multivibrator 34 serves to open gate circuit 28 for a time interval which is approximately equal to one full cycle of the echo train frequency and then recloses gate circuit 28. Thus, gate circuit 28 of signal circuit 14 is opened to pass any signals which are detected prior to arrival of the casing pipe echo train but is reclosed when the casing pipe echo train is due. On the other hand, gate circuit 18 of signal circuit 12 is opened when the casing pipe echo train is due and is reclosed after one half cycle of the casing pipe echo train has been passed.

Figure 2:
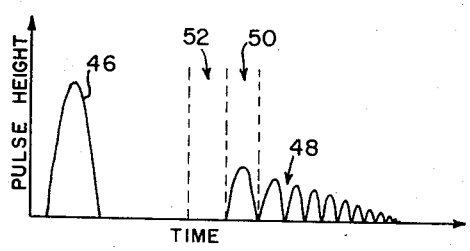
FIG. 2 is a representation of the signal provided by the apparatus of FIG. 1 in soft rock areas.
Figure 3:
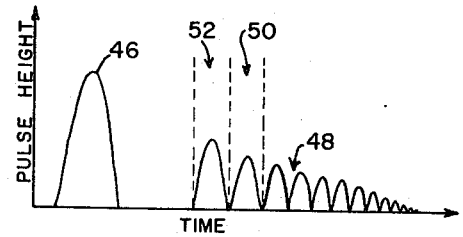
FIG. 3 is a representation of the signal provided by the apparatus of FIG. 1 in hard rock areas.
Figure 4:
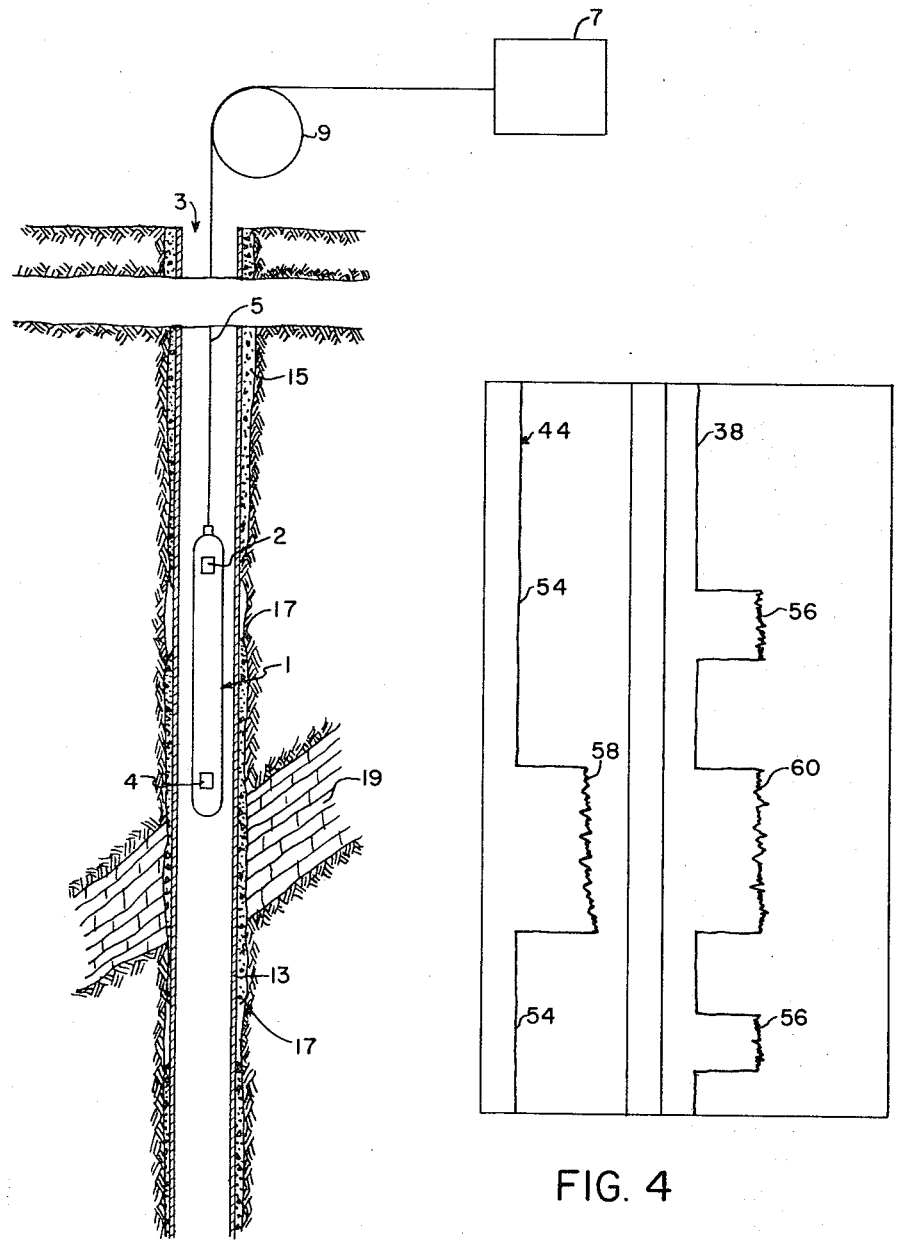
FIG. 4 is a representation of a portion of a cement bond log made with the apparatus of FIG. 1.

FIG. 2 represents the signals detected by receiver 4 in soft rock areas while FIG. 3 represents the signals detected by receiver 4 in hard rock areas. In these figures, the initial pulse is indicated at 46 and the casing pipe echo train is indicated at 48. The time interval during which gate circuit 18 of signal circuit 12 is open is indicated in FIGS. 2 and 3 by the dotted line zone 50 while the time interval during which gate circuit 28 of signal circuit 14 is open is indicated by dotted line zone 52. As discussed above, the casing pipe echo train reaches receiver 4 before the formation echo train in soft rock areas. When this occurs, no signal will be received during the time interval when gate circuit 28 of signal circuit 14 is open, as seen in zone 52 of FIG. 2. Accordingly, no signal will be supplied to trace 44 of recorder 40 during this interval and trace 44 will be a straight line, as seen at 54 in FIG. 4. When the casing pipe echo train arrives, gate circuit 18 of signal circuit 12 will be open to pass the first half cycle of the echo train signal, as seen in zone 50 of FIG. 2. This signal will be supplied to the recording galvanometer 39 which forms trace 38 of recorder 40 and, assuming that the cement bond is poor at this point, will cause a deflection of trace 38, as seen at 56 in FIG. 4. In hard rock areas, the formation echo train may arrive at receiver 4 ahead of the casing pipe echo train, as discussed above. When this occurs, a signal will be detected during the time interval when gate circuit 28 of signal circuit 14 is open, as shown in zone 52 of FIG. 3. This signal will then be supplied to the recording galvanometer 45 which forms trace 44 of recorder 40 and will cause a deflection in trace 44, as shown at 58 in FIG. 4. When the casing pipe echo train arrives, gate circuit 18 of signal circuit 12 will be open and will pass a signal, as indicated in zone 50 of FIG. 3. This signal will be passed to the recording galvanometer 39 forming trace 38 of recorder 40 and may indicate a poor bond by causing a deflection of trace 38, as shown at 60 in FIG. 4. This signal includes not only the signal from the casing but also a portion of the signal from the formation. As indicated above, trace 38 may indicate a poor bond under these conditions regardless of the actual condition of the bond. However, by comparing trace 38 with trace 44, it will be immediately apparent to the operator that the formation signal is interfering with the casing pipe signal at this point and that, consequently, the poor bond indication at point 60 of trace 38 is unreliable. However, by properly choosing the sensitivity of the two circuits; i.e., having casing signal circuit 12 set less sensitive than the formation signal circuit 14 by approximately a factor of 2, the amount of interference caused by the formation will cause approximately the same deflection in trace 38 as the deflection in trace 44. Therefore, if the log has corresponding deflections of traces 38 and 44 and if the amount of deflection is approximately the same in both, it can be assumed that the deflection in trace 38 resulted from formation interference and is not an indication of poor cement bond. However, if a corresponding deflection of trace 38 is greater than the deflection of trace 44, it can be assumed that not only was there interference from the formation, but also that the bond is ineffective. On the other hand, the lack of a deflection in trace 44 opposite points 56 of trace 38 shows that the poor bond indications at these points are valid. Thus, regardless of the condition of the formation, the operator can readily interpret the cement bond log provided by trace 38 in an accurate and reliable manner.

The method of the present invention comprises generating acoustic pulses at a first point in a cased borehole. These pulses are detected at a point in the borehole spaced a predetermined distance from the first point. The detected pulses are then converted into electrical signals which are transmitted via the cable to a pair of electronic gate circuits. Both of these gate circuits are normally closed. After a time delay, which is approximately equal to the time required for the acoustic pulses to travel through the casing from the first point in the borehole to the receiver, the first gate circuit is opened for a time interval which is preferably about equal to one half cycle of the frequency of the acoustic pulses. The signals passed during this interval will be the first half cycle of the casing pipe signal and, hence, will provide information concerning the condition of the cement bond. Accordingly, these signals will be recorded as one trace of the multiple trace recorder. The second gate circuit is opened slightly before the first gate circuit by a time interval which is approximately equal to one full cycle of the frequency of the acoustic pulses and is reclosed when the first gate circuit is opened. Thus, any formation signal which arrives before the casing pipe signal will provide a signal which will be passed by the second gate circuit as well as a portion which will be passed by the first gate circuit. The signals passed by the second gate circuit are recorded correlatively with the signals passed by the first gate circuit; hence, the operator can immediately determine when the formation signal has arrived prior to the casing pipe signal and that poor bond indications at that point are unreliable and can be assured that when there is no deflection of the formation signal deflection of the casing signal means poor bond conditions. Moreover, by adjusting the sensitivity of the two signal circuits so that the deflection of the two traces will be the same if there is only formation interference, then if the deflectoin of the trace reflecting casing characteristics is greater than the corresponding deflection of the trace reflecting formation characteristics, it can be assumed that the added deflection results from poor bond. Hence, even in hard rock areas where some formations may ordinarily cause erroneous deflections of an acoustic cement bond log, utilization of the present invention will result in a log that will disclose the condition of the cement along the entire length of the casing regardless of whether there is formation interference.

Obviously, the method of the present invention can be accomplished with other equipment than that described above. Moreover, numerous variations and modifications may be made in the method and apparatus described without departing from the present invention. Accordingly, it should be clearly understood that the form of the invention described above and shown in the figures of the accompanying drawings are illustrative only and are not intended to limit the scope of the invention.

What is claimed is:

1. The method of acoustic cement bond logging comprising the steps of:

generating an acoustic pulse at a first point in a cased borehole, detecting acoustic pulses at a second point in said borehole spaced a predetermined distance from said first point, converting the detected acoustic pulses into electrical signals, supplying said signals to a pair of gate circuits, opening one of said gate circuits to pass signals after a first time delay which is approximately equal to the time required for acoustic pulses to travel through the casing from said first point to said second point, closing said one of said gate circuits to block passage of signals after a second time delay which is approximately equal to one half cycle of the frequency of said acoustic pulse, opening the other of said gate circuits to pass signals during a third time interval which is approximately equal to one full cycle of the frequency of said acoustic pulse, closing said other of said gate circuits simultaneously with the opening of said one of said gate circuits, and correlatively recording the signals passed by each of said gate circuits.

2. Apparatus for acoustic cement bond logging comprising:
- a transmitter for emitting periodic acoustic pulses,
- a receiver spaced a predetermined distance from said transmitter to detect acoustic pulses and to convert detected pulses into electrical signals,
- a first electronic gate circuit,
- a second electronic gate circuit,
- means for supplying signals from said receiver to both of said gate circuits,
- a first one-short multivibrator triggered by said transmitter acoustic pulses providing a first time delay approximately equal to the time required for acoustic pulses to travel through the casing pipe from said transmitter to said receiver,
- a second one-short multivibrator responsive to a signal from said first multivibrator for opening said first gate circuit for a first time interval approximately equal to one half cycle of the frequency of said acoustic pulses,
- a third one-shot multivibrator triggered by said transmitter acoustic pulses providing a second time delay which is shorter than said first time delay by approximately one full cycle of the frequency of said acoustic pulses,
- a fourth one-shot multivibrator responsive to a signal from said third multivibrator for opening said second gate circuit for a time interval which is approximately equal to one full cycle of the frequency of said acoustic pulses,
- a multiple channel recorder having at least two recording galvanometers,
- means supplying signals passed by said first gate circuit to a first recording galvanometer of said recorder, and
- means for supplying signals passed by said second gate circuit to a second recording galvanometer of said recorder whereby the two signals are recorded correlatively to each other.

References Cited

UNITED STATES PATENTS

| | | | |
|---|---|---|---|
| 2,691,422 | 10/1954 | Summers et al. | 181—.5 |
| 2,963,646 | 12/1960 | Hicks et al. | 181—.5 |
| 3,170,136 | 2/1965 | Howes. | |
| 3,259,880 | 7/1966 | Zemanek | 181—.5 |
| 3,265,151 | 8/1966 | Anderson | 181—.5 |
| 3,291,247 | 12/1966 | Majani et al. | 181—.5 |
| 3,304,538 | 2/1967 | Zill | 181—.5 |

FOREIGN PATENTS 930,689    7/1963    Great Britain.

RICHARD C. QUEISSER, *Primary Examiner.*

J. W. MYRACLE, *Assistant Examiner.*

UNITED STATES PATENT OFFICE
CERTIFICATE OF CORRECTION

Patent No. 3,358,788 December 19, 1967

John C. Wilson

It is certified that error appears in the above identified patent and that said Letters Patent are hereby corrected as shown below:

Column 2, line 18, "fog" should read -- log --. Column 5, lines 5 and 9, "40", each occurrence, should read -- 30 --. Column 7, line 27, "one-short" should read -- one-shot --.

Signed and sealed this 29th day of July 1969.

(SEAL)
Attest:

Edward M. Fletcher, Jr.  WILLIAM E. SCHUYLER, JR.
Attesting Officer  Commissioner of Patents